Patented Dec. 5, 1922.

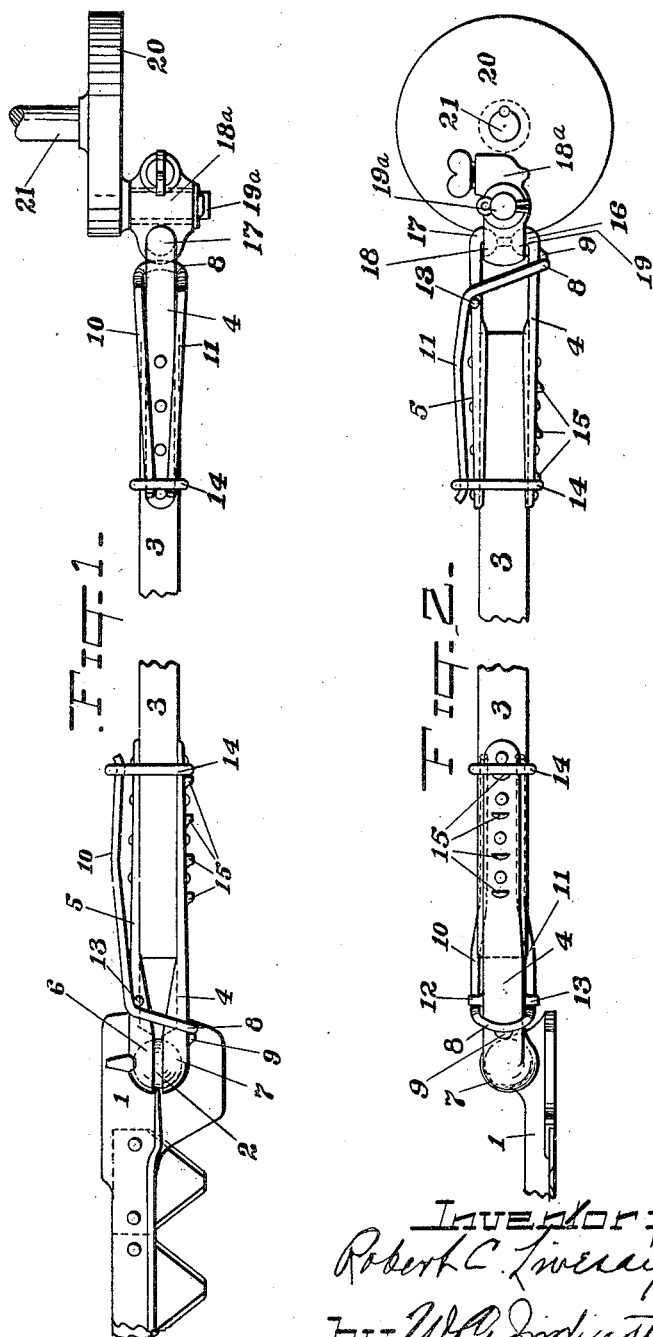

1,437,666

UNITED STATES PATENT OFFICE.

ROBERT C. LIVESAY, OF MOLINE, ILLINOIS, ASSIGNOR TO DEERE & COMPANY, OF MOLINE, ILLINOIS, A CORPORATION OF ILLINOIS.

PITMAN CONNECTION.

Application filed October 4, 1920. Serial No. 414,522.

*To all whom it may concern:*

Be it known that I, ROBERT C. LIVESAY, a citizen of the United States, residing at Moline, in the county of Rock Island and State of Illinois, have invented certain new and useful Improvements in Pitmen Connections, of which the following is a specification, reference being had therein to the accompanying drawing.

My invention relates to the connection of the pitman to the knife head and crank shaft of harvesting machines, and more particularly to the means employed to automatically compensate for the wear of operation. The object of my invention is to simplify such a device, so that it can be readily attached or detached, and to provide a device which is thoroughly efficient in operation.

Referring to the drawings in which similar numerals indicate identical parts—

Figure 1 is a plan view of my device, sufficient of a cutter bar and crank shaft of a harvester being shown to illustrate its application, and Figure 2 is a front elevation of Figure 1.

The knife head 1 is of a type well known in the art and is provided, preferably integral therewith, with a bearing member 2, preferably spherical in shape. The pitman 3 is made of wood, preferably, and is connected to the knife head 1 by pitman straps 4 and 5 bolted, or otherwise secured, at one end to the pitman 3, and having their other ends provided respectively with cups 6 and 7 forming bearings in which the member 2 is adapted to be held. In the operation of the harvester the action of the knife, or cutter is necessarily rapid and consequently wear will result between the member 2 and the cups 6 and 7, and if no provision is made to take up the wear the parts will become loose to the further damage of the mechanism. To automatically ensure a perfect fitting of the cups 6 and 7 on the member 2, I provide a rod spring having its central portion 8 formed into a loop the center of which contacts with a lug 9 on the strap 4.

The arms 10 and 11 of the spring extend rearwardly, and substantially parallel on opposite sides of the straps 4 and 5 respectively, and pass over lugs 12 and 13 on the strap 5 from which point the arms 10 and 11 extend in the direction of the pitman length, their ends converging and held within a link 14 surrounding the pitman 3 and the ends of the straps 4 and 5 secured thereon. By this construction the tension of the spring exerts its force to hold the bearings 6 and 7 closely against the member 2, the straps 4 and 5 having sufficient resiliency to give under pressure of the spring.

In order that the tension of the spring may be increased when desired the arms 10 and 11 thereof are bent away from the pitman, intermediate their length, and it will be clearly apparent that by moving the link 14 along the arms 10 and 11 and the pitman 3 toward the knife head 1, the arms will be brought closer to the pitman and consequently the pressure of the bearings 6 and 7 on the member 2 will be increased, and if such adjustment is made the pressure of the spring can be decreased by moving the link to the position shown in the drawing. On the face of the strap 4 is a series of lugs or stops 15, preferably equidistant from each other, against any one of which the link 14 contacts according to the degree of adjustment desired.

A similar spring device is used at the connection of the pitman 3 with crank shaft 21 of a harvester, and similar numerals are used as are employed to designate parts alike to those at the knife head end of the pitman. At the crank end of the pitman 3, however, instead of a bearing member 2 and cups 6 and 7 on the straps 4 and 5, as utilized at the knife head end of the pitman, I form a semispherical end 16 to the strap 4 and a similar end 17 to the strap 5 which engage respectively with sockets 18 and 19, shown in dotted lines in Figure 2, in a bearing member or casting 18$^a$ journaled on a wrist pin 19$^a$ on the crank head 20 of the harvester, the spring in each instance operating in a similar way and with a similar result.

It is clearly evident that by disengaging the links 14 from the ends of the arms 10 and 11 the springs can be readily removed or replaced.

What I claim is—

1. A pitman connection having in combination, a pitman, resilient straps secured at one end to opposite sides of the pitman and having oppositely opposed bearings in their free ends, a bearing member adapted to be held in said bearings, a spring embracing one of said straps and having arms extending transversely of said straps on opposite sides thereof, means on the second strap over which said arms are bent in a direction lengthwise of the pitman, whereby the spring operates to press the bearing ends of the straps together, and means to engage with said arms to hold them in place.

2. A pitman connection having in combination, a pitman, resilient straps secured at one end to opposite sides of the pitman and having oppositely opposed bearings in their free ends, a bearing member adapted to be held in said bearings, a rod spring bent intermediate its ends and having the bend in contact with one of said straps and from the bend extending in two arms transversely of both straps and on opposite sides thereof, means on the second strap over which said arms are bent in a direction lengthwise of the pitman, whereby the tension of the spring operates on both straps to press the bearing ends thereof against the bearing member, and means on the pitman to engage with the end portions of said arms.

3. A pitman connection having in combination, a pitman, resilient straps secured at one end to opposite sides of the pitman and having oppositely opposed bearings in their free ends, a bearing member adapted to be held in said bearings, a spring embracing one of said straps and having arms extending transversely of said straps on opposite sides thereof, means on the second strap over which said arms are bent in a direction lengthwise of the pitman, whereby the spring operates to press the bearing ends of the straps together, and means operable to vary the tension of the spring.

4. A pitman connection having in combination, a pitman, resilient straps secured at one end to opposite sides of the pitman and having oppositely opposed bearings in their free ends, a bearing member adapted to be held in said bearings, a spring embracing one of said straps and in contact with a stop thereon, the spring having arms extending transversely of the straps and on opposite sides thereof, means on the second strap over which said arms are bent in a direction lengthwise of the pitman whereby the spring operates to press the bearing ends of the straps together.

5. A pitman connection having in combination, a pitman, resilient straps secured at one end to opposite sides of the pitman and having oppositely opposed bearings in their free ends, a bearing member adapted to be held in said bearings, a spring embracing one of said straps and in contact with a stop thereon, the spring having arms extending transversely of the straps and on opposite sides thereof, lugs on the second strap over which said arms are bent to extend in a direction lengthwise of the pitman whereby the spring operates to press the bearing ends of the straps together.

6. A pitman connection having in combination, a pitman, a bearing member, resilient straps secured at one end to opposite sides of the pitman and having their opposite ends in retaining contact with the bearing member, a spring embracing one of said straps and having transverse arms on opposite sides thereof, means on the second strap over which said arms are bent in a direction lengthwise of the pitman whereby the spring operates to press the ends of the arms in contact with said bearing member toward each other, and means to engage with said arms to hold them lengthwise of the pitman.

7. A pitman connection having in combination, a pitman, a bearing member, resilient straps secured at one end to opposite sides of the pitman and having their opposite ends in retaining contact with the bearing member, a spring embracing one of said straps and having transverse arms on opposite sides thereof, means on the second strap over which said arms are bent in a direction lengthwise of the pitman whereby the spring operates to press the ends of the arms in contact with said bearing member toward each other, means to hold said arms lengthwise of the pitman, and means to adjust said holding means to vary the tension of the spring.

ROBERT C. LIVESAY.